June 14, 1966  D. BERLIN  3,256,016
COMBINATION BABY SWING AND AUTOMOBILE SEAT
Filed April 24, 1964  4 Sheets-Sheet 1

INVENTOR.
DANIEL BERLIN
BY
Caesar and Rivise
ATTORNEYS.

INVENTOR.
DANIEL BERLIN

June 14, 1966     D. BERLIN     3,256,016
COMBINATION BABY SWING AND AUTOMOBILE SEAT
Filed April 24, 1964     4 Sheets-Sheet 3
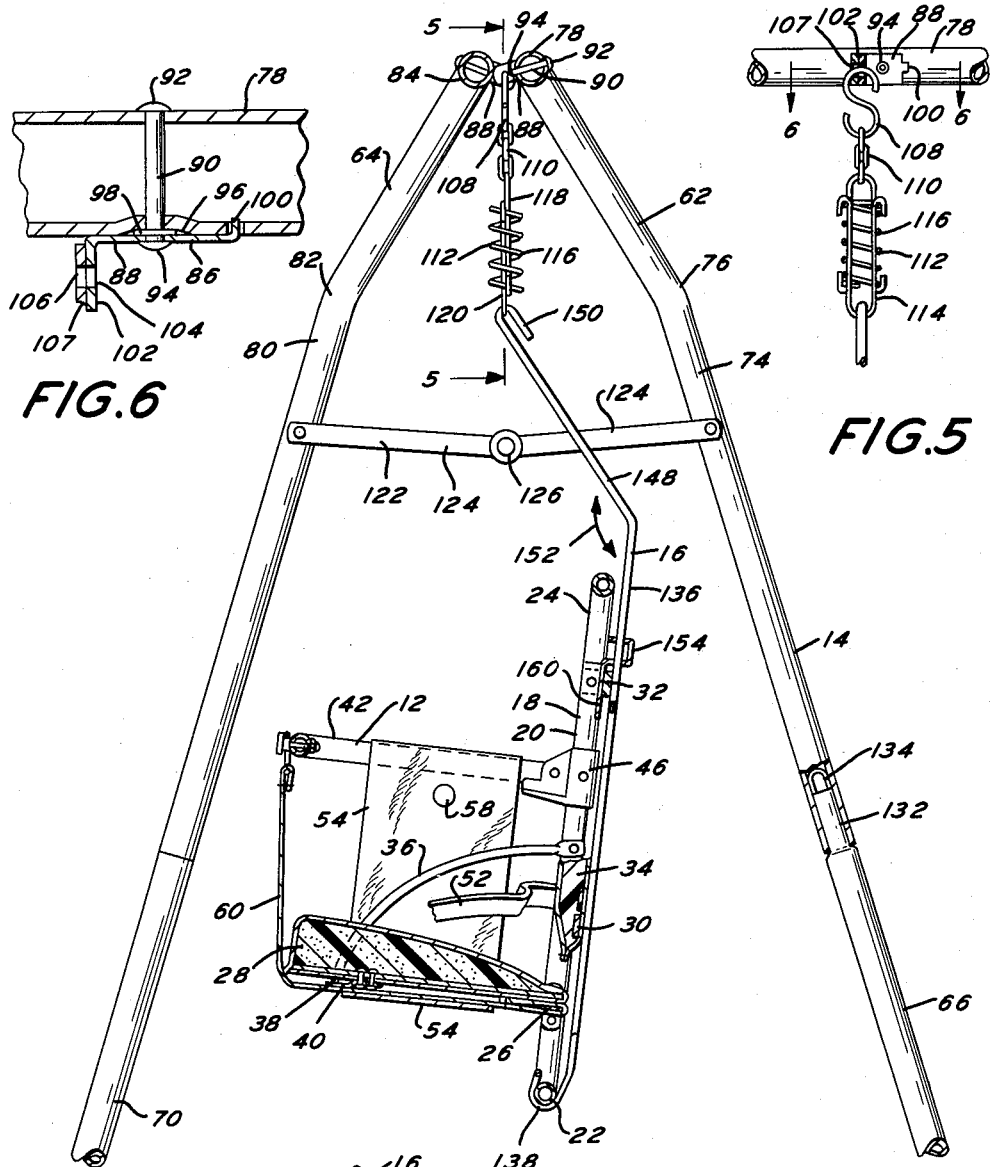
INVENTOR.
DANIEL BERLIN
BY
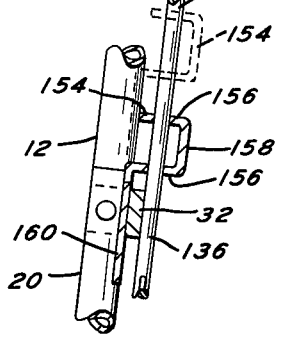
ATTORNEYS.

June 14, 1966   D. BERLIN   3,256,016
COMBINATION BABY SWING AND AUTOMOBILE SEAT
Filed April 24, 1964   4 Sheets-Sheet 4

INVENTOR.
DANIEL BERLIN
BY
Caesar and Rivise
ATTORNEYS.

United States Patent Office 3,256,016
Patented June 14, 1966

3,256,016
COMBINATION BABY SWING AND
AUTOMOBILE SEAT
Daniel Berlin, 4424 Paul St., Philadelphia, Pa.
Filed Apr. 24, 1964, Ser. No. 362,412
3 Claims. (Cl. 272—85)

This invention relates to a combination swing and automobile seat for use by a child and more particularly relates to a novel and versatile device combining fetaures which heretofore have required separate constructions. In particular, the present invention provides a child's automobile seat that can be suspended upon the back portion of an automobile seat or, alternatively, can be securely associated with a unique bracket mechanism which is mounted for oscillatory movement upon the frame of a swing assembly.

It is known to provide seats specially adapted to hold a child in an automobile which contain features for elevating the child and also for preventing the child from leaving the seat until desired. Exemplary of such seats is one shown in Berlin application Serial No. 182,779, filed March 27, 1962 and now Patent No. 3,146,026.

It is also known to provide swing devices including a seat which undergoes oscillatory movement. However, it has been recognized in the present invention that the provision of separate seats for use in an automobile and for use in a swing mechanism constitutes a duplication of parts since when the child is travelling in an automobile there ordinarily would be no use for the seat which is associated with the swing mechanism. In a similar way, when the child is placed in the swing, there would seem to be no use for the idle child's automobile seat.

Furthermore, with seats presently used in swing assemblies it has been found that such seats tend to rock when the seat changes direction. For instance, when the seat reaches the limit of its backward travel and starts its forward pass, the child's head is jerked backwardly. In a similar way the child will be thrust forwardly on the front stroke.

It is therefore an object of the present invention to provide a convertible swing and automobile seat which is highly versatile and which can easily be utilized as an automobile seat or as a supporting seat for a child in a swing mechanism.

Yet another object of the present invention is to provide a novel bracket mechanism which is associated with the swing frame and which easily and safely receives the child's seat which theretofore had been utilized in an automobile.

A still further object of the present invention is to provide a novel bracket mechanism which when used with a swing frame will support a child's automobile seat at a slight backward tilt.

Still another object of the present invention is to provide a novel bracket mechanism which is adapted to convert a child's automobile seat of varying construction for use in connection with a swing frame.

The foregoing as well as other objects of the present invention are achieved by providing a child's automobile seat of varying construction, such as one constructed in accordance with Soltis Patent No. 2,533,527 or said Berlin application Serial No. 182,779. With the unique bracket mechanism of the present invention, the aforesaid child's automobile seat can be simply and safely associated with the frame of a swing mechanism. The unique bracket mechanism is essentially a multi-planar U-shaped member including U-shaped holding means for receiving the bight of the main frame of the child's automobile seat. Central rods extend from the U-shaped holding means in order to receive the child's automobile seat in an appropriate upright but slightly backwardly inclined position. Connecting links extend from each of the central rods in order to suspend the bracket mechanism from spring means which are secured for oscillatory motion to the swing frame. Locking means are provided to releasably secure the child's automobile seat to the bracket mechanism. With the locking means disengaged, it is a simple matter to lift the child's automobile seat away from the bracket mechanism.

Other objects and many of the attendant advantages of this invention will be readily appreciated as the same becomes better understood by reference to the following detailed description when considered in connection with the accompanying drawings wherein:

FIG. 3 is a sectional view taken along the lines 3—3 of FIG. 2;

FIG. 4 is a fragmentary enlarged view, partly in phantom, of a detail in FIG. 3 showing a seated locking means in full line and showing in phantom the locking means when moved to the released position;

FIG. 5 is a sectional view taken along the lines 5—5 of FIG. 3;

FIG. 6 is an enlarged sectional view taken along the lines 6—6 of FIG. 5;

Figure 1:
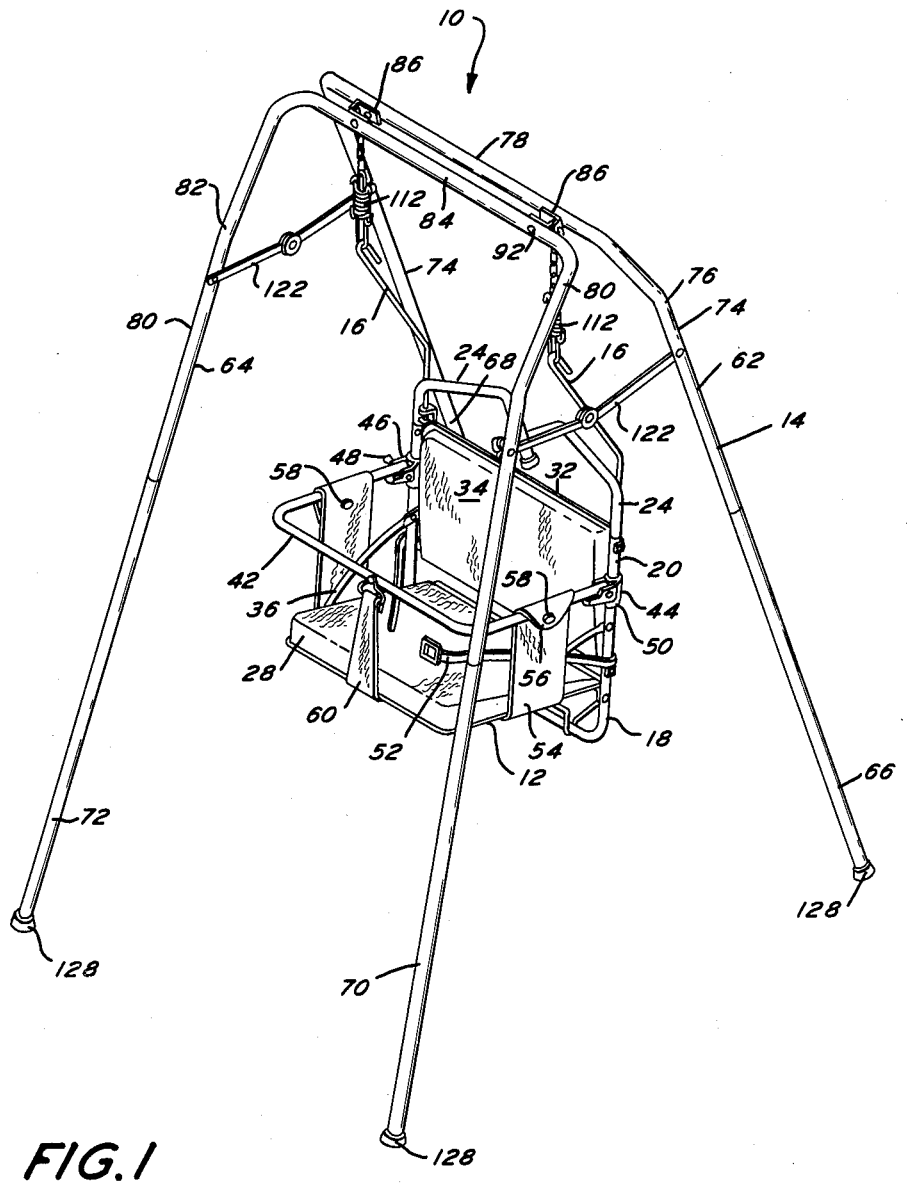
FIG. 1 is a perspective view of a child's convertible swing and automobile seat embodying the present invention.

Referring now to the various figures of the drawing wherein like reference characters refer to like parts, a convertible swing and automobile seat of the present invention is generally shown at 10 in FIG. 1. As shown in FIG. 1, there are basically three component parts of the present invention. They are, automobile seat 12, swing frame 14 and bracket mechanism 16.

Figure 2:
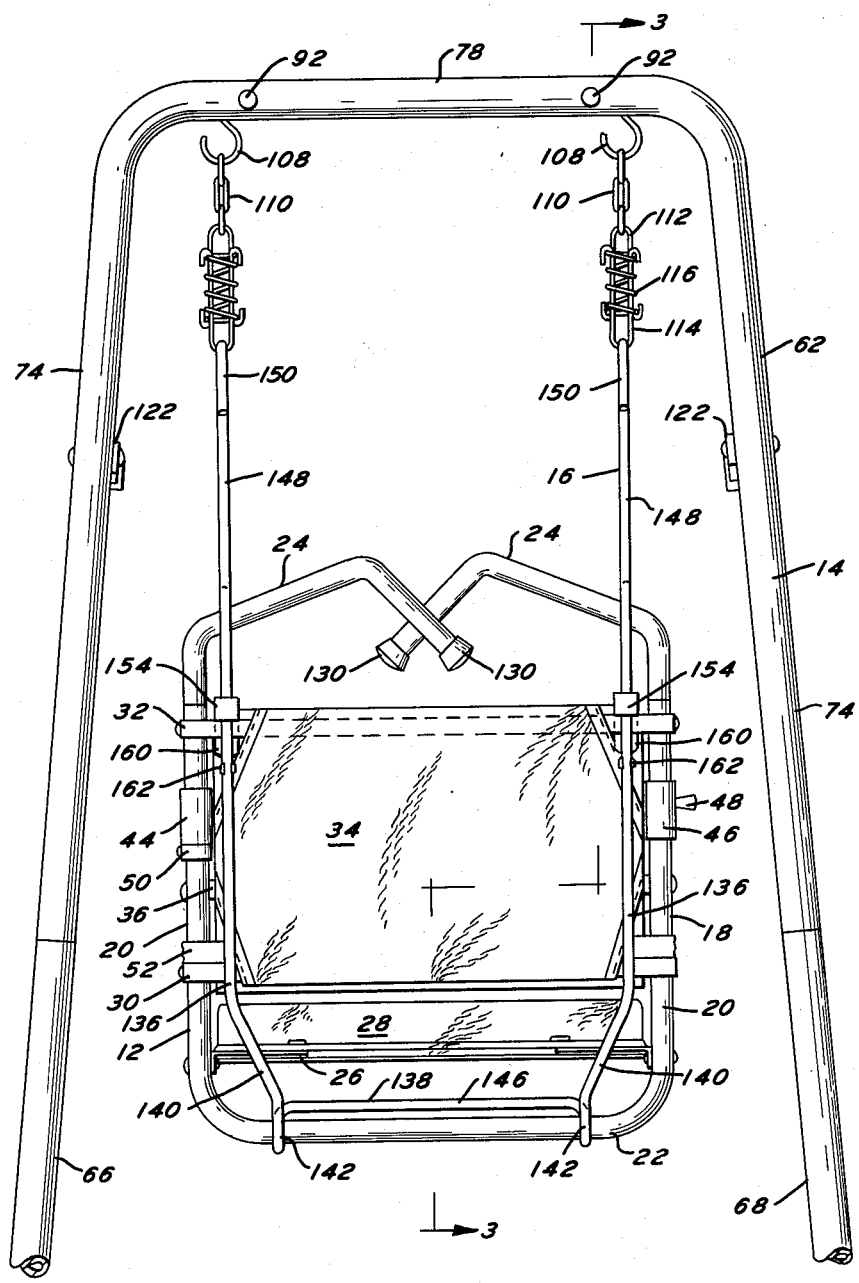
FIG. 2 is an enlarged fragmentary rear elevational view of the convertible swing and automobile seat of FIG. 1.
Figures 7, 8:
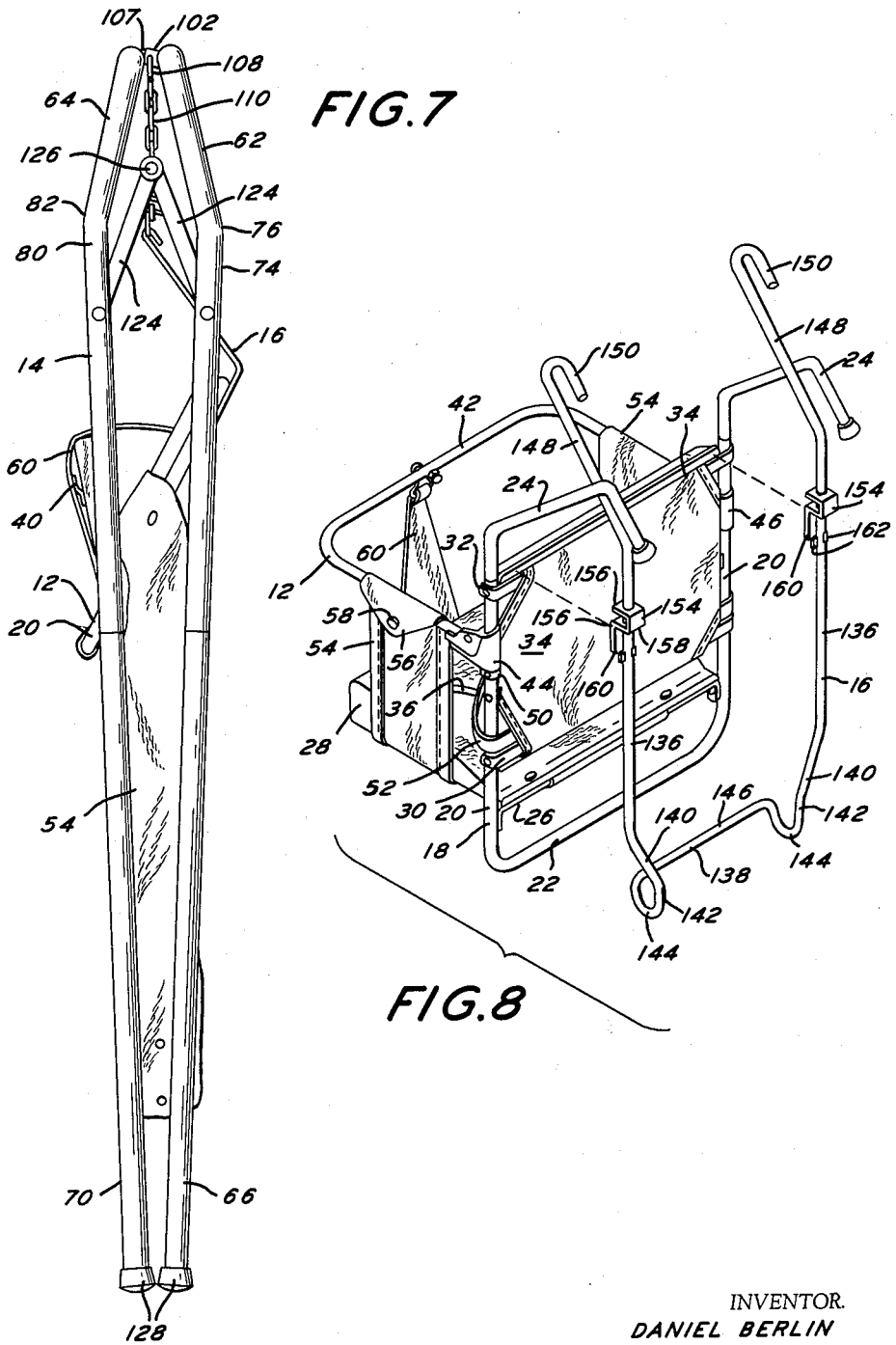
FIG. 7 is a side elevational view of the convertible swing and automobile seat of FIG. 1 brought to a collapsed position.
FIG. 8 is an exploded perspective view taken generally from the rear thereof of the bracket mechanism of the present invention with a child's automobile seat about to be secured thereon.

The automobile seat 12 is generally constructed along the lines of the child's automobile seats disclosed in said Berlin application Serial No. 182,779, although seats of different construction can easily be used with the unique bracket mechanism of the present invention. As best shown in FIGS. 2 and 8, the automobile seat 12 basically comprises a vertical U-shaped frame 18 having legs 20 and a bight portion 22 connecting the legs 20. Suspending hooks 24 that can swivel are united to the free ends of the frame 18 in order to suspend the automobile seat 12 from the seat portion of an automobile. Closure caps 130 are used to cover the free ends of the hooks 24.

The automobile seat 12 further possesses a first cross member 26 having ends pivotally secured to vertical frame 18. A seat 28 is secured to the first cross member 26 so that the seat 28 can be pivoted towards the plane of the vertical U-shape frame 22 when the automobile seat 12 is to be brought to the collapsed position. As further shown in FIG. 8, second and third cross members 30 and 32 are provided which span the space between the legs 20 and the frame 18. Each of the cross members 30 and 32 are fixedly secured at each end thereof to one of the legs 20. A back 34 is secured to the second and third cross members 30 and 32, and the back 34 may be cushioned in order to enhance the comfort of the child user. A U-shaped bail 36 has its ends pivoted to the frame 18 with the bight portion 38 thereof adapted to be inserted (FIG. 3) in holding means 40 which is secured to the underside of seat 28. As shown in FIG. 3, the U-shaped bail is for the purpose of supporting the seat 28 in a generally horizontal position when the automobile seat 12 is in use either in connection with an automobile or with a swing frame. A swingable guard rail 42 is provided in order to prevent the child from leaving the seat until desired. The guard rail 42 may pivot in either a horizontal plane or between a horizontal and vertical plane as desired by the user. In order to do this, the guard rail 42 has one end permanently pivotally secured to first receiving means 44 (FIG. 1). The other end of the guard rail is releasably pivotally secured to second receiving means 46. The releasable securement with receiving means 46 is achieved by using a pin 48 which can be depressed to unseat another pin that makes for the pivotal connection between the end of the guard rail 42 and the second receiving means 46.

It is thus seen that because of the aforesaid pivotal connections to the means 44 and 46, the guard rail 42 can pivot upwardly from the horizontal position of FIG. 1 toward a vertical plane and can return to the horizontal position of FIG. 1 as desired by the user. In addition to the foregoing, the first receiving means 42 is itself mounted to swivel about the leg 20 of the frame 18. Thus, when the other end of the guard rail 42 is released from second receiving means 46 by depression of the pin 48, the guard rail 42 can be pivoted in a horizontal plane about an axis which corresponds to the leg 20 which runs through first receiving means 44. While the first receiving means 44 are swivelly mounted upon a leg 20, the second means 46 are fixedly secured to the other leg 20. As shown in FIG. 2, the first receiving means 44 is prevented from slipping downwardly by means of a sleeve 50 which is pinned to the leg 20.

A strap 52 with appropriate buckle means is secured about the legs 20 and runs forwardly so that it can be tightened about a child placed in the seat 12. Side confining means 54 are provided having free ends 56 which can be secured about guard rail 42 by means of snaps 58 with the side confining means 54 passing beneath seat 28 as illustrated in FIG. 3. Front confining means 60 are provided to have one end secured to the first cross member 26 with the remainder thereof being led centrally beneath the seat 28 and then forwardly, as shown in FIG. 1, to be secured to the front section of the guard rail 42. This is done in a releasable manner by means of an attaching ring that is positioned about a head extending from the guard rail 42. As shown in FIG. 3, the front confining means 60 is positioned closely adjacent the seat 28 with the side confining means 54 passing externally of the front confining means 60.

The aforesaid construction forms no part of the present invention but has been discussed in detail as exemplary of child's automobile seats that can be used in connection with the present invention and to make for a better understanding of the present invention. Of course, child's automobile seats of other constructions can be utilized with the bracket mechanism of the present invention with the particular automobile seat shown in the drawings of the present invention being for purposes of illustration only.

The swing frame 14 is shown in detail in FIG. 1 and basically comprises U-shaped supports 62 and 64 which extend from removable legs 66, 68, 70 and 72. The U-shaped support 62 includes arms 74 which are bent slightly at 76 with the arms 74 extending from a bight portion 78.

The U-shaped support 64 includes arms 80 which are bent slightly at 82 and which extend from bight portion 84. As shown in FIG. 1, the bight portions 78 and 84 are positioned closely adjacent each other in forming the swing frame 14. As shown in FIGS. 1, 3, 5 and 6, the bight portions 78 and 84 are secured together. This is accomplished by means of short angle pieces 86 which are secured to each of the bight portions 78 and 84 at two points thereof as illustrated in FIG. 1. As shown in FIG. 6, a first side 88 of an angle piece 86 is secured to the bight portion 78 by means of fastener 90 that passes through the tubular walls of the bight portion 78. Fastener 90 possesses an outwardly facing head 92 and an inwardly facing head 94 each of which are positioned externally of the bight portion 78. Depressions 96 are formed at spaced points along the bight portion 78 wherever it is desired to pass a fastener 90. The depression 96 receives a washer 98 that is interposed between the tubular wall of bight portion 98 and the head 94 shown in FIG. 6. The first side 88 terminates in a bent tip 100 that is received in a complementary opening formed in the tubular wall of bight portion 78 in order that the short angle piece 86 will be firmly secured to the bight portion 78. The other side 102 of the short angle piece 86 extends perpendicularly from the side 88 in the direction toward the other bight portion 84. The side 102 possesses an opening 104 which, as shown in FIG. 6, is aligned with an opening 106 in one of the sides of an angle piece 107 that is secured to the other bight portion 84.

As shown in FIG. 5, an S-shaped hanger piece 108 is secured to the swing frame assembly by having an end thereof pass through the aligned openings 104 and 106. The hanger piece 108 supports a link 110 which in turn secures spring means 112. As shown in FIG. 2, the spring means 112 comprises an extensible body portion 114 with coil spring mechanism 116 of a construction well known in the art. The spring means 112 are preferably somewhat inelastic and provide just enough resiliency in order to achieve a smooth oscillating action and eliminate any jerking motions especially at the end of a movement in one direction and the start of the return movement in the opposite direction. As shown in FIG. 3, the extensible body portion 114 is comprised of two separable pieces 118 and 120 with the piece 118 extending from the link 110 and the upper end of the bracket mechanism 16 depending from the piece 120. The piece 120 may move relative to the piece 118 as when a child is positioned in the automobile seat 12 as permitted by the coil spring mechanism 116.

As further shown in FIG. 3, the arms 74 and 80 of the U-shaped members 62 and 64 are secured together in pairs by a collapsible brace mechanism 122 including links 124 having one end thereof pivotally secured to one of the arms 74 or 80 with the free ends thereof secured together at 126 so that a pair of arms 74 and 80 can be positioned either in the open position of FIG. 3 or collapsed toward each other in the closed position of FIG. 7 wherein the sides 102 and 107 pivot with respect to one another. As further shown in FIG. 7, the lower ends of the legs 64, 66, 68 and 70 are closed by means of closure caps 128 which also make for better contact with the floor. As shown in FIG. 3, the legs 66, 68, 70 and 72 are releasably secured to arms 74 and 80 by means of a spring mechanism. The upper end of the leg 66 is swaged down in a somewhat smaller diameter 132 with the loop of a spring 134 extending externally therefrom as shown in FIG. 3. The spring 134 is so dimensioned that it is slightly wider than the inside diameter of the tubing from which arms 74 is constructed. Thus, spring 134 will be received in the tubing 74 in a forced fit and will tend to be held in place.

The bracket mechanism 16 which enables the automobile seat 12 to be usable with the swing frame 14 and is best shown in FIGS. 2 and 8 with reference also being made to FIGS. 3 and 4. The bracket mechanism 16 is multi-planar and basically comprises a pair of parallel central rods 136 which are joined together at their lower ends by U-shaped holding means 138. As shown in FIG. 3, the central rods 136 are joined to the holding means 138 by inwardly inclined sections 140 (FIG. 2) which are in the plane of the rods 136. The sections 140 then merge with co-planar short rods 142. The short rods 142 then merge in curved fingers 144 which are joined together by bight 146.

The upper ends of the central rods 136 merge with forwardly inclined links 148 which terminate at their free ends in hooks 150. As will be discussed hereinafter, the angle between the central rods 136 and the links 148, as indicated by the arrows 152 (FIG. 3) is preferably approximately 131° to 135° and can be quite critical. It has been determined by experimentation that when the angle between the rods 136 and the links 148 lies between 131° and 135° that the child sitting in the seat as arranged in FIG. 3 will be comfortably balanced. The angle defined by the arrows 152 basically arises from the location of the center of gravity of a child sitting upon the seat 28. It is to be noted that the center of gravity of the child will be so located as to be somewhat offset from a line passing through hanger piece 108 and link 110 to achieve an off-center cantilever loading. Therefore, the child will remain with his back slightly inclined backwardly in a comfortable swing position, with his weight being so balanced to maintain the slight tilt of the seat 12 as shown in FIG. 3. Should the angle defined by the arrows 152 be substantially greater than 135°, it has been found that there will be a tendency for the weight of the child to cause the seat 12 to tilt forwardly. Where the angle defined by the arrows 152 is substantially less than 131°, it is found that there is a tendency for the seat to tilt backwardly for an uncomfortable amount. In addition to the foregoing, the U-shaped holding means 138, as shown in FIG. 3, are maintained at a 25° tilt with respect to a vertical plane.

As further shown in FIG. 8, locking means 154 are slidably positioned up on the rods 136. The locking means 154 include upper and lower walls 156 (FIG. 4) joined together by end wall 158. Appropriate openings are formed in the walls 156 to permit the locking means 154 to be slidably mounted upon the rods 136. Locking tabs 160 depend from the lower wall 156. Lugs 162 are provided on the rods 136 in order to limit the descent of the locking means 154 with the openings in the walls 156 of the locking means having additional slots complementary to the lugs 162 in order to permit the descent of the locking means 154 in one position beyond the lugs 162.

The operation of the locking means 154 is illustrated in FIGS. 3 and 4 wherein the position of the locking means 154 just prior to locking the auto seat 12, the bracket mechanism 16 is shown in phantom in FIG. 4. In order to achieve the locking action, it is necessary to move the locking means 154 downwardly from the phantom position of FIG. 4 so that the tab 160 is seated forwardly of third cross member 32 of automobile seat 12. When this occurs there is a tight engagement between the tab 160 and the third cross member 32. In order to remove the seat 12 from the frame 16, it is a simple matter to raise the locking means 154 so that the tabs 160 are no longer positioned against the third cross member 32, and thus the auto seat 12 may be removed by hand from the bracket mechanism 16.

In order to insert the auto seat 12 on the bracket mechanism 16, it is a simple matter to position the auto seat 12 so that the bight 22 of the U-shaped frame 18 thereof will be seated in the U-shaped holding means 138 and particularly it will be nested in short rods 142 and curved fingers 144 of the U-shaped holding means 138. When this is done, the legs 20 of the vertical frame 18 of the seat 12 will be positioned immediately in front of and against the cross-members 30 and 32 (FIG. 2). The securement of the auto seat 12 to the bracket mechanism 16 is completed by the downward movement of the locking means 154 as shown in FIG. 4.

It is thus seen that the frame 16 provides a simple and economical solution to the problem of utilizing a child's automobile seat in connection with a swing frame. As shown in FIG. 3, the central rods 136 of the bracket mechanism 16 are tilted slightly backwardly. In other words, the central rods 136 lie at a slight obtuse angle with respect to the ground with the angle between the rods 136 and the links 148 being most preferably in the range of 131° to 135°. When this is done, the slight backward tilt of the child's automobile seat will be maintained even when the child is seated thereon. Thus, the seat 12 when used in connection with the swing frame 14 will always be tilted slightly backwardly thereby leading extreme comfort to the child. This is quite an improvement over devices heretofore used in connection with swing frames wherein there was no backward tilt. Thus, the child's head was many times forced forwardly during the forward pass of the swing, and then uncomfortably backwardly in a snap action in the backward pass of the swing. With the present invention, the child is at all times supported with a slight backwards tilt, and this is a very comfortable position that also avoids the frontward and backward rocking and snapping action of swings heretofore used.

Obviously, many modifications and variations of the present invention are possible in the light of the above teachings. It is, therefore, to be understood that within the scope of the appended claims, the invention may be practiced otherwise than as specifically described.

What is claimed as the invention is:

1. A combination baby swing and automobile seat comprising a bracket mechanism for supporting a child's automobile seat upon a swing frame, said child's automobile seat including a frame having legs extending from a bight portion and at least one cross-member extending between said legs, said bracket mechanism including spaced central rods extending from U-shaped holding means and connecting links extending at an obtuse angle from said central rods to suspend the bracket mechanism from said swing frame, said bight portion of said seat being received in said holding means with the cross-member of said seat being supported against said central rods whereby when said links are secured to said swing frame to suspend said bracket mechanism therefrom, said central rods will be generally vertically disposed, but at a slight backward tilt.

2. The invention of claim 1 wherein said angle lies between 131° and 135°.

3. The invention of claim 1 including locking means slidably positioned on at least one of said central rods, said locking means including a tab adapted to be seated against said cross-member.

References Cited by the Examiner
UNITED STATES PATENTS 2,807,309  9/1957  Saint et al. _____ 272—86
2,992,854  7/1961  Berlin _____ 297—256

RICHARD C. PINKHAM, *Primary Examiner.*

F. B. LEONARD, *Assistant Examiner.*